United States Patent
Pomara, Jr.

[11] Patent Number: 5,713,264
[45] Date of Patent: Feb. 3, 1998

[54] METHOD AND SYSTEM FOR AUTOMATICALLY GRILLING FOOD PRODUCTS

[75] Inventor: Johnny B. Pomara, Jr., 2223 Crockett Dr., Carrollton, Tex. 75006

[73] Assignees: Johnny B. Pomara, Jr.; Industrial Catering, Inc., both of Grand Prairie, Tex.

[21] Appl. No.: 628,274

[22] Filed: Apr. 5, 1996

[51] Int. Cl.[6] .................................................. A47J 37/10
[52] U.S. Cl. .................................. 99/423; 99/427; 99/393
[58] Field of Search ........................ 99/423, 425, 427, 99/443 C, 349, 377, 393, 422

[56] References Cited

U.S. PATENT DOCUMENTS

| Re. 32,994 | 7/1989 | Adamson et al. | 99/332 |
|---|---|---|---|
| 1,143,603 | 6/1915 | Aaron | 99/377 |
| 3,397,655 | 8/1968 | Valadez et al. | 107/15 |
| 3,483,813 | 12/1969 | Noel | 99/423 |
| 3,565,015 | 2/1971 | Jorgensen | 107/15 |
| 3,580,164 | 5/1971 | Baker | 99/339 |
| 3,604,336 | 9/1971 | Straub et al. | 99/327 |
| 3,739,712 | 6/1973 | Duning | 99/349 |
| 3,965,807 | 6/1976 | Baker | 99/375 |
| 4,213,380 | 7/1980 | Kahn | 99/349 |
| 4,444,094 | 4/1984 | Baker et al. | 99/327 |
| 4,586,428 | 5/1986 | Adamson | 99/332 |
| 4,838,153 | 6/1989 | Escamilla et al. | 99/349 |
| 4,913,040 | 4/1990 | Sherman et al. | 99/372 |
| 4,938,126 | 7/1990 | Rubio et al. | 99/349 |
| 5,197,377 | 3/1993 | Jennings et al. | 99/347 |
| 5,249,914 | 10/1993 | Cahlander et al. | 414/793.4 |
| 5,388,503 | 2/1995 | Buerkle | 99/349 |

*Primary Examiner*—Reginald L. Alexander
*Attorney, Agent, or Firm*—Baker & Botts L.L.P.

[57] ABSTRACT

A system for automatically grilling food products is disclosed. The system includes an upper cook plate (126) affixed to a platform (124) capable of vertical movement. A lower cook plate (132, 134) is affixed to a reciprocating shuttle (131) which can be positioned horizontally to align a desired portion of the lower cook plate with the upper cook plate (126). Food products such as hamburger patties are alternately loaded onto each side of the lower cook plate (132, 134). Each side of the lower cook plate is alternately moved into alignment with the upper cook plate (126). A control mechanism (180, 190) automatically and synchronously controls the movement of the upper cook plate platform (124) and the positioning of the shuttle (131) so as to automatically grill the food products on both sides.

10 Claims, 7 Drawing Sheets

METHOD AND SYSTEM FOR AUTOMATICALLY GRILLING FOOD PRODUCTS

TECHNICAL FIELD OF THE INVENTION

This invention relates generally to the field of food cooking equipment and more particularly to a method and system for automatically grilling food products.

BACKGROUND OF THE INVENTION

The use of grills for cooking food items in restaurants, especially for cooking hamburgers, is well-established. Non-automated grills in common use comprise a relatively large cooking surface which is heated from beneath by electric heating elements or gas burners.

These grills can only cook one side of a hamburger patty or other food item at a time, thus requiring a human operator to turn the items over during cooking and remove them when they have been cooked to the desired temperature. Additionally, the use of such grills relies on the judgment of the human operator concerning the optimum cooking time for the food items. Errors in judgment can result in food products which are not cooked to uniform temperatures and the possibility of food contamination due to undercooking.

The advent of the fast food restaurant several decades ago created a demand for cooking devices with high throughput and low labor requirements. In particular, as hamburgers became the predominant food item served by fast food restaurants, a need was arose for a system that efficiently and uniformly cooks hamburger patties and other food products.

U.S. Pat. No. 3,604,336 describes an automated cooking device for flame-broiling hamburger patties. According to this invention, the patties are placed at predetermined intervals on a conveyor belt. The conveyor belt, which comprises a series of transverse parallel bars attached to two lateral side chains, moves the patties through a plurality of cooking stations, stopping at each station to allow further cooking of the patties. Each cooking station comprises two opposed open-flame gas burners, one underneath and one above the conveyor. The patties are thus flame-broiled from both sides at once.

While this device provides uniformity of cooking time and temperature, it has several disadvantages. First, because there is no solid surface supporting the hamburger patties while they are being cooked, fat and juices created during the cooking process drip down onto and below the lower gas burners. This creates a need for shielding the gas burners from the drippings while still allowing heat transfer from the burners to the patties. Such shielding is costly and not completely effective.

Furthermore, this apparatus is large and requires more space than a conventional hamburger grill. This can cause difficulties in replacing a conventional grill with the apparatus, since rearrangement of the restaurant's kitchen area may be necessitated by the larger size of the flame-broiler. Moreover, the additional valuable space occupied by this larger apparatus increases rental costs and reduces profits for the restaurant.

In addition, this apparatus is not suitable for cooking eggs, pancakes and other food items in addition to hamburgers. Thus, a restaurant which serves these food items would require a standard grill in addition to the automated hamburger grill.

Other automated grills, including those described in U.S. Pat. Nos. 4,444,094 and 3,965,807 share these same problems. Such grills are large and cannot readily be used to replace a standard-size non-automated grill.

U.S. Pat. No. 5,197,377 describes a clamshell cooking apparatus. This apparatus comprises a heated upper cook plate assembly which may be installed onto a standard grill. The upper plate pivots down on hinges to cook the upper side of a hamburger at the same time that the lower side is being cooked. While this reduces cooking time and labor requirements, it does not eliminate the need for a human operator to place and remove the patties from the cooking area. Nor does this device eliminate the possibility of errors in judgment on the part of the human operator concerning the best cooking time for optimum taste and consumer safety.

Therefore, a need has arisen for a new method and system for grilling food products that overcomes the disadvantages and deficiencies of the prior art. In particular, it is an object of the present invention to provide a system for automatically grilling food products which is compact in size and can be fit into the space occupied by a standard non-automated grill. Another object of the invention is to provide a system which is capable of automatically cooking a variety of food items, including hamburgers. A further object of the invention is to provide a system which automatically cooks food products for a desired period of time, providing the optimum taste and safety for the consumer.

SUMMARY OF THE INVENTION

A system for automatically grilling food products is disclosed. The system comprises an upper cook plate affixed to a platform capable of vertical movement, a lower cook plate affixed to a reciprocating shuttle which can be positioned horizontally to align a desired portion of the lower cook plate with the upper cook plate, and a control mechanism for automatically and synchronously controlling the movement of the upper cook plate platform and the positioning of the shuttle.

A method for automatically grilling food products is disclosed. This method comprises the steps of placing a first set of food products on a first area of a lower cook plate, the lower cook plate being affixed to a reciprocating shuttle; automatically positioning the shuttle so that the first area of the lower cook plate is in alignment with an upper cook plate affixed to a platform; automatically positioning the platform so that the upper cook plate contacts the first set of food products; placing a second set of food products on a second area of the lower cook plate; automatically positioning the platform so that the upper cook plate breaks contact with the first set of food products; automatically positioning the shuttle so that the second area of the lower cook plate is in alignment with the upper cook plate; and automatically positioning the platform so that the upper cook plate contacts the second set of food products.

In another embodiment, a system for automatically grilling food products comprises an upper cook plate affixed to a platform capable of vertical movement, a plurality of lower cook plates affixed to a conveyor system which can be positioned to align a desired group of the lower cook plates with the upper cook plate, and a control mechanism for automatically and synchronously controlling the movement of the upper cook plate platform and the conveyor.

A technical advantage of the present invention is that a method and system for automatically grilling food products is disclosed. Another technical advantage is that the invention reduces labor costs involved in food production. Another technical advantage is that the invention provides an automatic grill which occupies approximately the same area as a standard non-automated grill. Another technical advantage is that the automatic grill cooks all food items for a desired length of time, providing for standardized food production which maximizes taste and safety for the consumer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

The preferred embodiment of the present invention and its advantages are best understood by referring to FIGS. 1 through 7 of the drawings, like numerals being used for like and corresponding parts of the various drawings.

Figure 1:
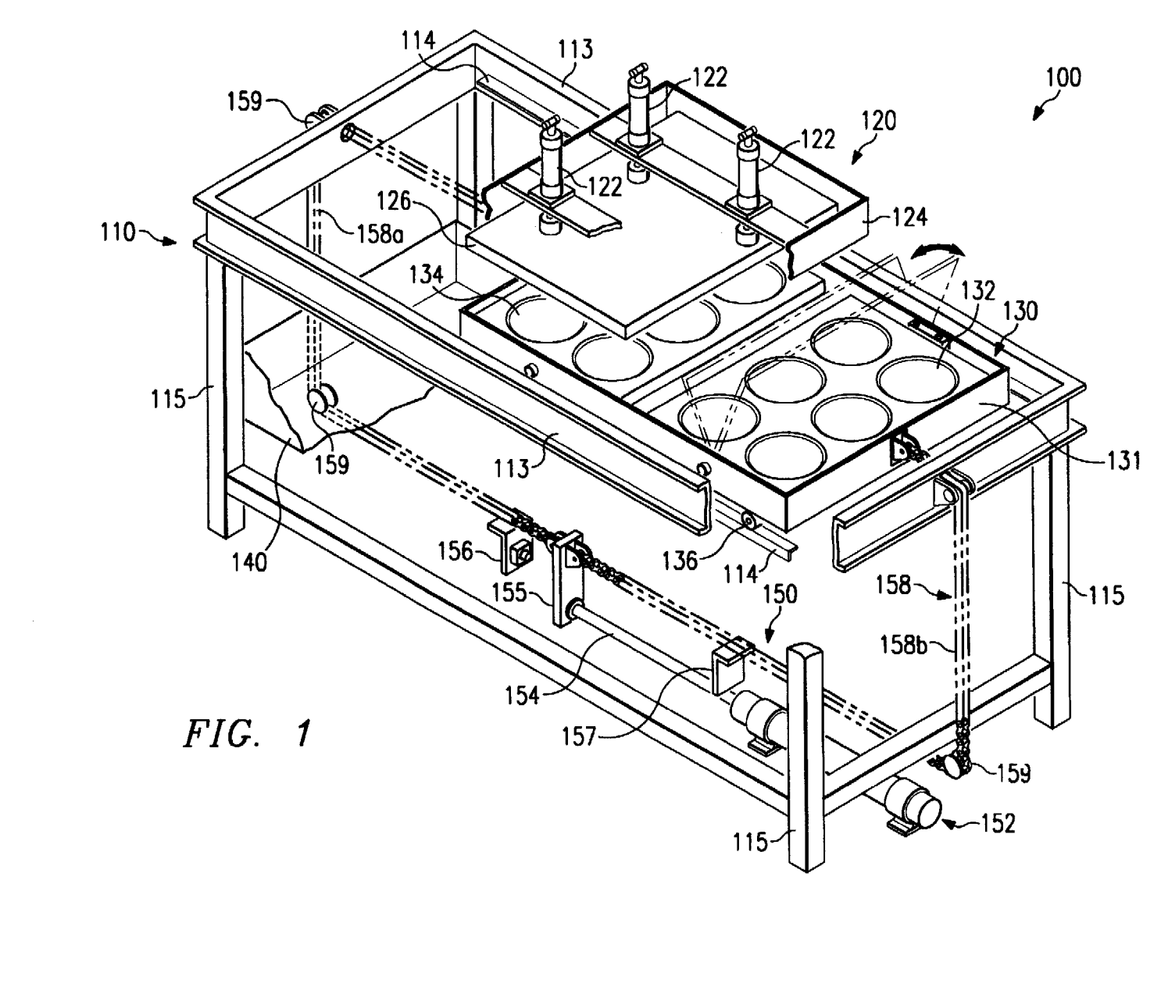
FIG. 1 shows one embodiment of a system for automatically grilling food products in accordance with the present invention.
Figure 2A:
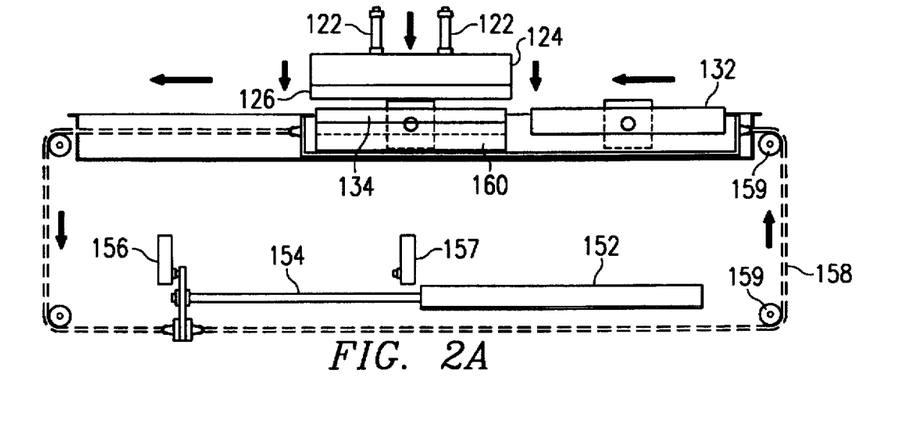
FIGS. 2A, 2B, and 2C illustrate the operation of the system of FIG. 1.
Figure 2B:
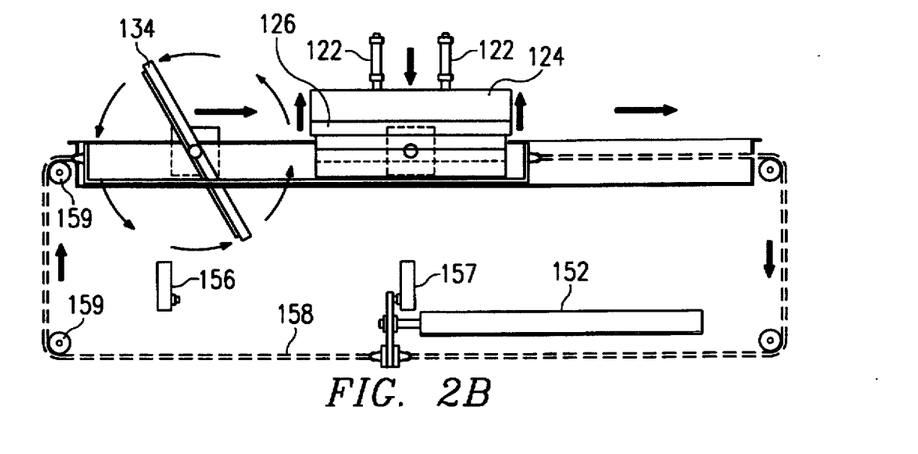
Figure 2C:
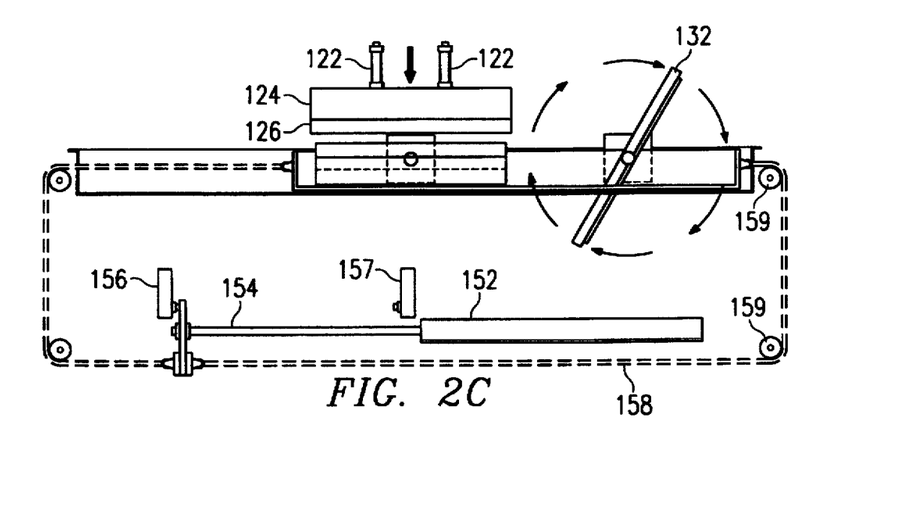

Referring to FIGS. 1 and 2, an automated grill 100 in accordance with the invention is shown. The grill 100 comprises a rigid rectangular frame 110, an upper cook plate assembly 120, a lower cook plate assembly 130, a collection pan 140, and a shuttle drive assembly 150.

The frame 110 comprises horizontal cross members 113, legs 115, and parallel wheel tracks 114 affixed to the cross members 113. The collection pan 140 is mounted on the frame 110 at a level below the wheel tracks 114.

The lower cook plate assembly 130 comprises a reciprocating shuttle 131, first and second lower cook plate sections 132 and 134, respectively, and wheels 136. The first and second lower cook plate sections 132 and 134 are each pivotally attached to the shuttle 131 to allow each lower cook plate section to rotate about a horizontal axis with respect to the shuttle 131. The wheels 136 rest on the wheel tracks 114 to allow the lower cook plate assembly 130 to roll horizontally along the tracks 114.

A heating plate 160 is affixed to the frame 110 in a position just below the lower cook plate sections 132 and 134 and in vertical alignment with the upper cook plate assembly 120. The heating plate 160 is heated by the lower heating means 162.

The shuttle drive assembly 150 comprises a drive chain 158, drive chain pulleys 159, drive air cylinder stop switches 156 and 157, and a drive air cylinder 152 including a piston rod 154 and a chain attachment 155. The drive air cylinder 152 may be mounted on the frame 110 or on the floor of the restaurant as shown.

The drive chain 158 comprises drive chain segments 158a and 158b. Drive chain segments 158a and 158b are attached to the piston rod 154 of the drive air cylinder 152 via the chain attachment 155. Drive chain segment 158a is attached to one end of the reciprocating shuttle 131, while drive chain segment 158b is attached to the opposite end of the reciprocating shuttle 131. The drive chain pulleys 159 are affixed to the frame 110 and provide largely frictionless guidance for the drive chain 158 around the frame 110.

The upper cook plate assembly 120 comprises an upper cook plate 126, a platform 124, press air cylinders 122 and an upper heating means 127. The upper cook plate 126 is affixed to the platform 124, which is in turn affixed to the press air cylinders 122. The press air cylinders 122 are affixed to an upper extension (not shown) of the frame 110. The upper heating means 127, which will be described more fully below, is adjacent to and operable for heating the upper cook plate 126. The press air cylinders 122 are operable to vertically position the upper cook plate assembly 120.

Figure 5:
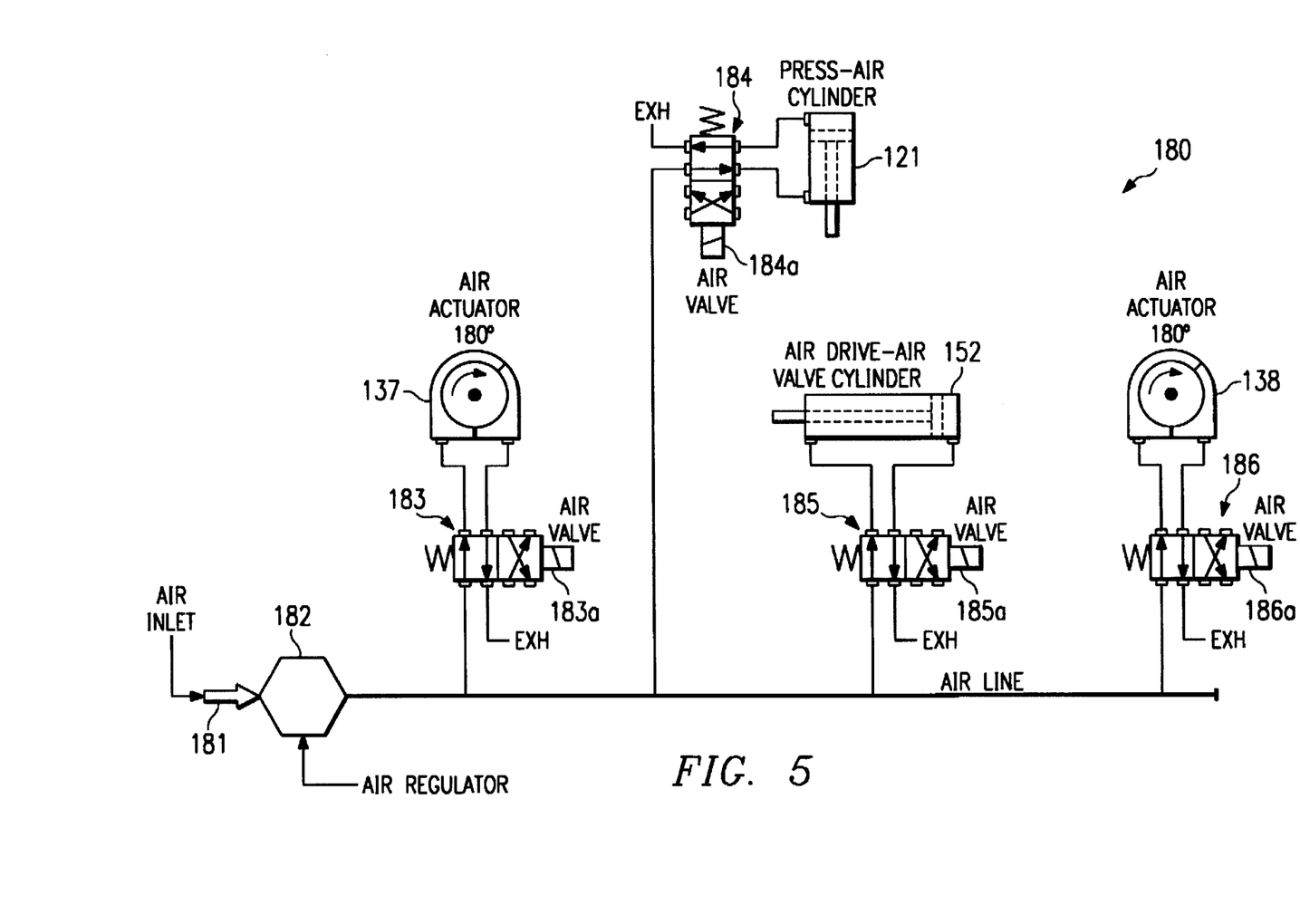
FIG. 5 shows an air circuit for use in accordance with the invention.

The motive force for the automated grill 100 is provided by an air circuit 180 shown in FIG. 5. Compressed air is provided at the air inlet 181. The pressure of the air is regulated by the regulator 182. Thus, a uniform air pressure is provided at the air valves 183–186. Air valves 183 and 186 control the direction of air flow through the air actuators 137 and 138, respectively. Air actuators 137 and 138 apply rotational force to the lower cook plate sections 134 and 132, respectively, with the direction of applied rotational force depending on the direction of air flow through the actuators 137 and 138.

Air valves 184 and 185 control the direction of air flow through the press air cylinders 122 and the drive air cylinder 152, respectively, thus controlling the movements of the upper cook plate assembly 120 and the lower cook plate assembly 130, respectively. Air valves 183–186, along with the heaters 127 and 162, are controlled by a control circuit 190, shown in FIG. 6. Three-phase power is supplied from a power source (not shown) to the main disconnect switch 191. When the main disconnect switch 191 is closed, power is supplied to the manual heater switch 197. When the heater switch 197 is closed, then power is supplied to the upper heater controller 194a and the lower heater controller 194b. These controllers receive input from thermocouples 195a and 195b, respectively, which monitor the temperature of the upper heating means 127 and heating plate 160, respectively.

Figure 6:
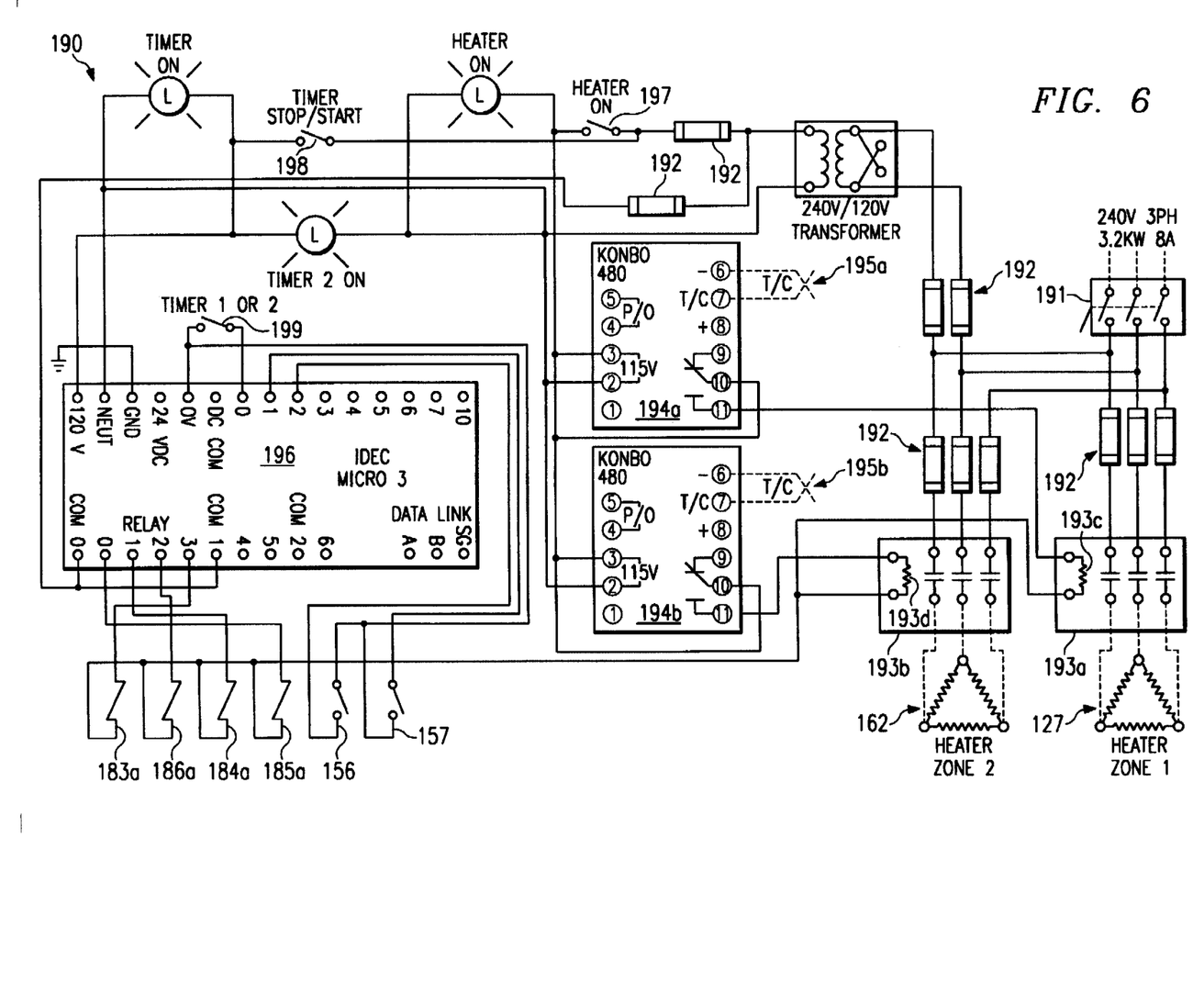
FIG. 6 is a diagram of a control circuit in accordance with the invention.

The heater controllers 195a and 195b act as thermostats to keep the upper and lower cook plates at their desired temperatures. The heater controllers 195a and 195b control the temperatures of the upper and lower cook plates by opening and closing power switches 193a and 193b, respectively. These switches, when closed, carry current to the heaters 127 and 162, respectively.

Controller 196 receives input from the limit switches 156 and 157, which indicate when the shuttle 131 has reached its leftmost or rightmost position. Controller 196 provides output signals to the solenoids 183a–186a, which in turn control the air circuit valves 183–186, respectively. Controller 196 contains internal timers, and activates the solenoids 183a–186a so as to maintain the following operational sequence.

The human operator first loads hamburger patties onto the first lower cook plate section 132 and activates the system by closing switches 191 and 197. The shuttle drive assembly 150 automatically moves the shuttle so that the first lower cook plate section 132 is vertically aligned with the upper cook plate 126 and with the heating plate 160, which heats the first lower cook plate section 132 to cooking temperature. The press air cylinders 122 lower the upper cook plate 126 so that contact is made with the hamburger patties on the first lower cook plate section 132. While the patties are being cooked on both sides, the human operator loads additional uncooked patties onto the first lower cook plate section 134.

After a preset period of time, the press air cylinders 122 lift the upper cook plate 126. The shuttle drive assembly 150 then moves the second lower cook plate section 134 into vertical alignment with the upper cook plate 126 and with the heating plate 160, which heats the second lower cook plate section 134 to cooking temperature. The press air cylinders 122 lower the upper cook plate 126 so that contact is made with the second group of hamburger patties.

Meanwhile, actuator 138 rotates the first lower cook plate section 132 so that the cooked hamburger patties slide down onto the collection pan 140. Actuator 138 then rotates the first lower cook plate section 132 back to its original horizontal position. At this point the human operator loads more uncooked hamburger patties onto the first lower cook plate section 132.

After a preset period of time, the press air cylinders 122 lift the upper cook plate 126. The shuttle drive assembly 150 then moves the first lower cook plate section 132 into vertical alignment with the upper cook plate 126 and with the lower heating plate 160, which heats the first lower cook plate section 132 to cooking temperature. The press air cylinders 122 lower the upper cook plate 126 so that contact is made with the third group of hamburger patties.

Meanwhile, actuator 137 rotates the second lower cook plate section 134 so that the cooked hamburger patties slide down onto the collection pan 140. Actuator 137 then rotates the second lower cook plate section 134 back to its original horizontal position. At this point the human operator loads more uncooked hamburger patties onto the second lower cook plate section 134.

This process, illustrated in FIGS. 2A, 2B and 2C, continues indefinitely until the human operator switches the system off by means of the main disconnect switch 191. Except for the loading of hamburger items onto the lower cooking plate, the entire process proceeds automatically, with uniform cooking times and temperatures being applied to all of the hamburger patties.

Figure 3:
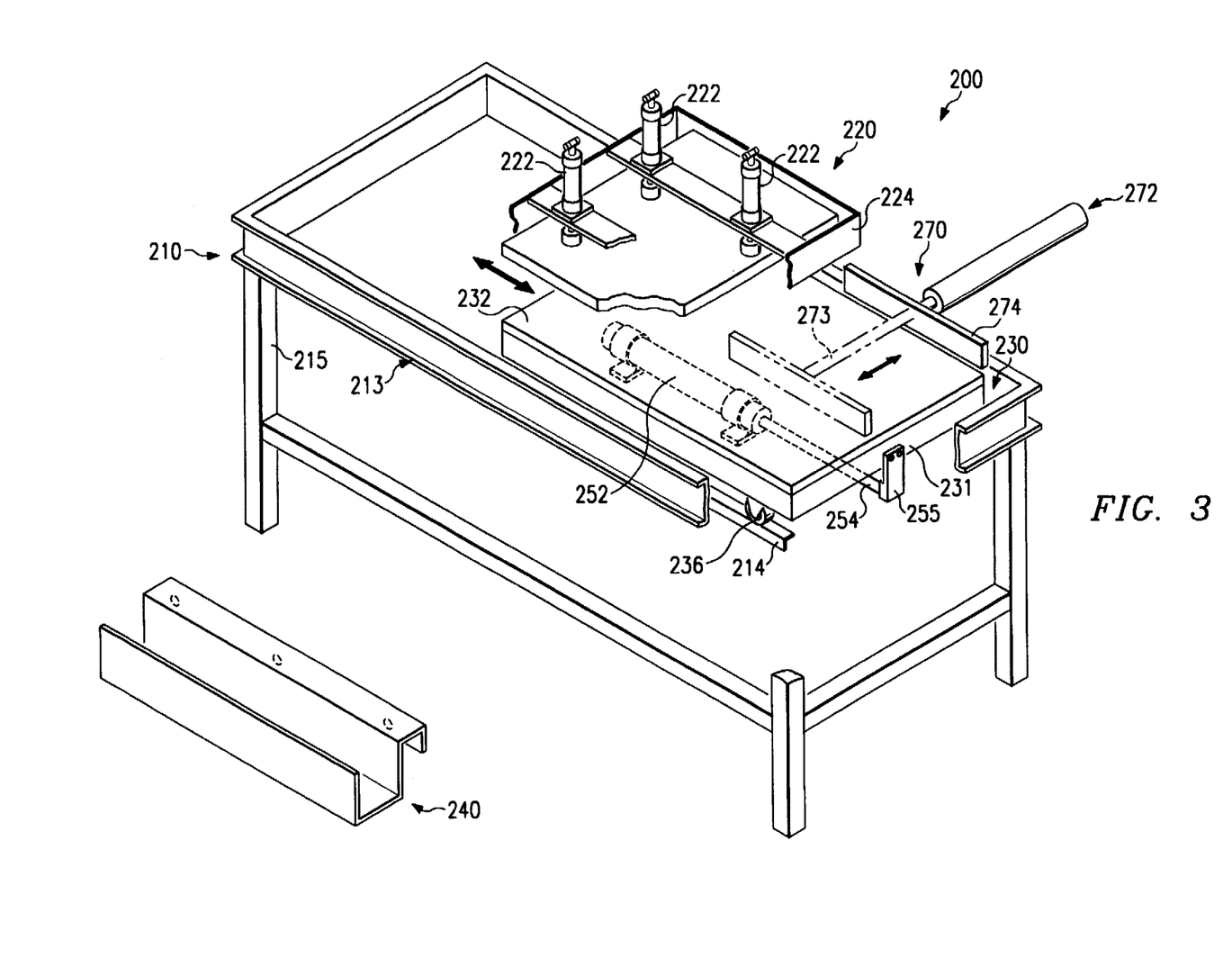
FIG. 3 shows a second embodiment of a system for automatically grilling food products in accordance with the present invention.
Figure 4A:
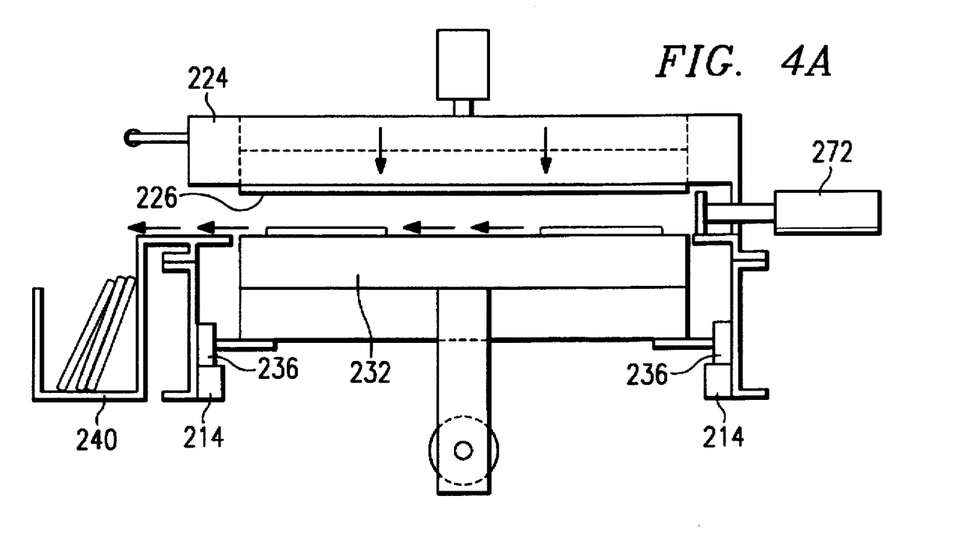
FIGS. 4A and 4B illustrate the operation of the system of FIG. 3.
Figure 4B:
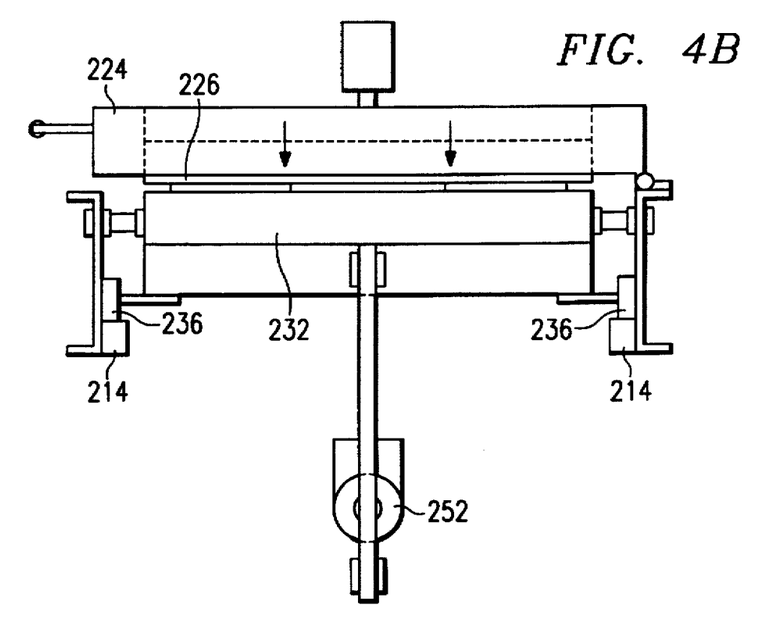

An alternative embodiment of the invention is shown in FIGS. 3, 4A and 4B. The frame 210 of the automated grill 200 comprises cross members 213, legs 215, and wheel tracks 214 as described with respect to the previous embodiment. The upper cook plate assembly 220 is substantially as described above, with 200-series reference numerals corresponding to the 100-series numerals used above.

The lower cook plate assembly 230 comprises a reciprocating shuttle 231, a lower cook plate 232, and wheels 236. The wheels 236 rest on the wheel tracks 214 to allow the lower cook plate assembly 230 to roll horizontally along the tracks 214. Lower cook plate 232 is heated by a lower heating means (not shown).

The shuttle drive assembly 250 comprises a drive air cylinder 252 including a piston rod 254 and a shuttle attachment 255. The drive air cylinder 252 may be mounted on the frame 210 or on the floor of the restaurant. The shuttle attachment 255 is attached to the piston rod 254 and the shuttle 231.

A first food product removal means 270 comprises an air cylinder 272, a piston rod 273, and a food product removal arm 274. The food product removal arm 274 is adjacent to one-half of the lower cook plate 232 when the other half of the lower cook plate 232 is in alignment with the upper cook plate 226.

The food product removal arm 274 can be moved by the air cylinder 272 and piston rod 273 across the lower cook plate 232 so as to remove grilled food products from the lower cook plate 232. The food products are pushed by the food product removal arm 274 into the collection pan 240. The collection pan 240 is attached to a cross member 213 of the frame 210. After pushing the food products off the lower cook plate 232 the food product removal arm 274 returns to its original position on the opposite side of the lower cook plate 232 from the collection pan 240.

Alternative embodiments of the food product removal means 270 may be used. For example, a rodless air cylinder extending across the lower cook plate 232 may be substituted for the air cylinder 272. The food product removal arm 274 would then be attached beneath the rodless air cylinder in substantially the same position as shown. The rodless air cylinder would operate to sweep the food product removal 274 arm across one half of the lower cook plate 232 as described above.

The sequence of operation of automated grill 200 is similar to that of automated grill 100. The operator first loads hamburger patties onto the right half of the lower cook plate 232 and activates the system. The shuttle drive assembly 250 automatically moves the shuttle so that the right half of the lower cook plate 232 is vertically aligned with the upper cook plate 226. The press air cylinders 222 lower the upper cook plate 226 so that contact is made with the hamburger patties on the right half of the lower cook plate 232. While the patties are being cooked, the human operator loads additional uncooked patties onto the left half of the lower cook plate 232.

After a preset period of time, the press air cylinders 222 lift the upper cook plate 226. The shuttle drive assembly 250 then moves the left half of the lower cook plate 232 into vertical alignment with the upper cook plate 226. The press air cylinders 222 lower the upper cook plate 226 so that contact is made with the second group of hamburger patties.

Meanwhile, air cylinder 272 pushes the food product removal arm 274 across the right half of the lower cook plate 232 so that the cooked hamburger patties fall into the collection pan 240. Air cylinder 272 then retracts the food product removal arm 274 to its original position. At this point the human operator loads more uncooked hamburger patties onto the right half of the lower cook plate 232.

After a preset period of time, the press air cylinders 222 lift the upper cook plate 226. The shuttle drive assembly 250 then moves the right half of the lower cook plate 232 into vertical alignment with the upper cook plate 226. The press air cylinders 222 lower the upper cook plate 226 so that contact is made with the third group of hamburger patties.

Meanwhile, a left-side air cylinder (not shown) pushes a left-side food product removal arm (not shown) across the left half of the lower cook plate 232 so that the cooked hamburger patties fall into the collection pan 240. The left-side air cylinder then retracts the left-side food product removal arm to its original position. At this point the human operator loads more uncooked hamburger patties onto the left half of the lower cook plate 232.

This process continues indefinitely, until the human operator switches the system off. Except for the loading of hamburger items onto the lower cook plate 232, the entire process proceeds automatically, with uniform cooking times and temperatures being applied to all of the hamburger patties.

Figure 7A:
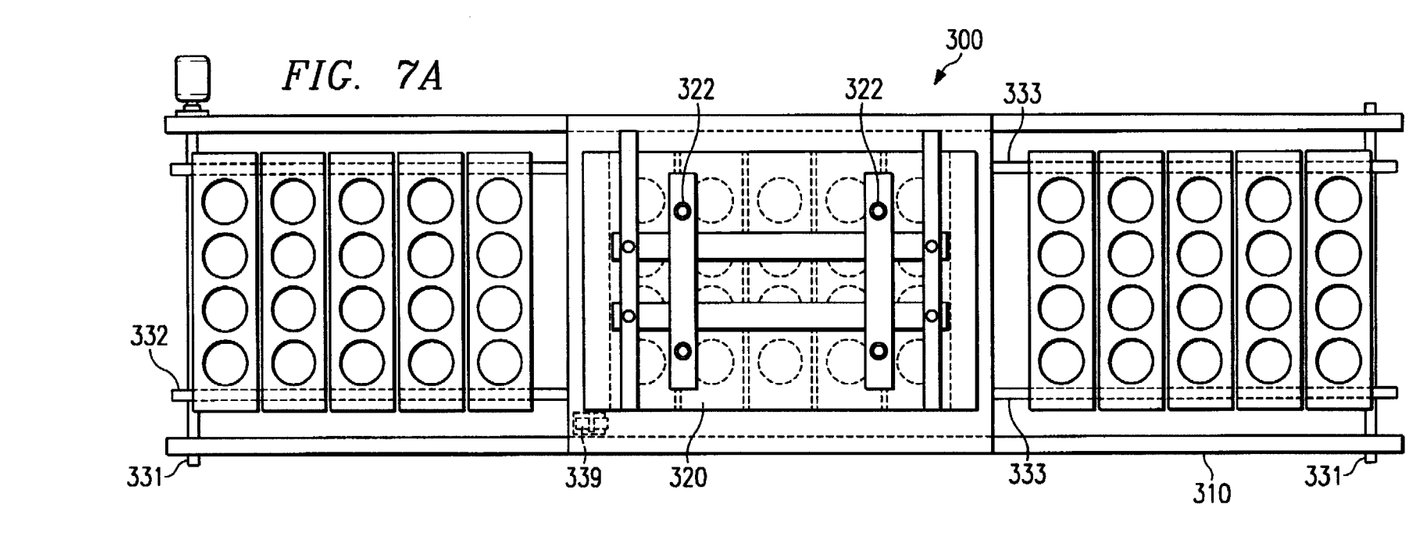
FIG. 7A is a top view of a third embodiment of a system for automatically grilling food products in accordance with the present invention.
Figure 7B:
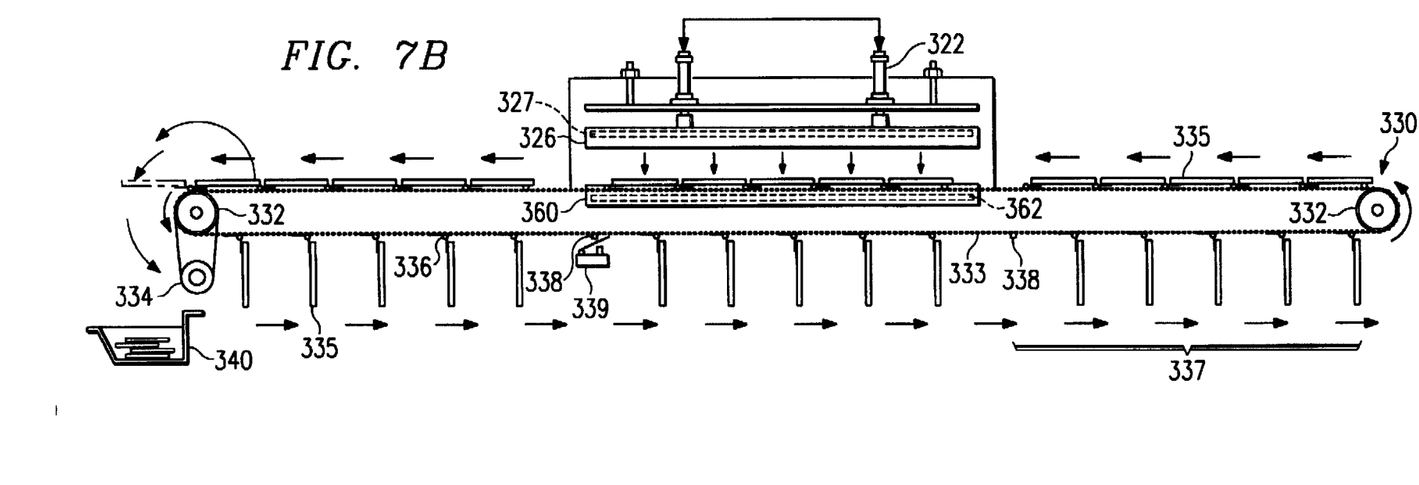
FIG. 7B is a front view of the third embodiment of the system for automatically grilling food products in accordance with the present invention.

Another embodiment of the invention is shown in FIGS. 7A and 7B. Automated grill 300 has a frame 310, an upper cook plate assembly 320, a collection pan 340, and a conveyor 330. Upper cook plate assembly 320 has press air cylinders 322, an upper cook plate 326, and upper heating means 327. Upper cook plate assembly 320 operates in substantially the same manner as previously described for automated grill 100.

Frame 310 holds the axles 331 of sprockets 332 positioned at opposite ends of automated grill 300. Sprockets 332 engage two drive chains 333, which run along opposite sides of the frame 310. Sprockets 332 are rotated by a motor 334, which causes the upper segments of drive chains 333 to move to the left, and the lower segments of drive chains 333 to move to the right, as indicated by the arrows in FIG. 7B. A series of cook plates 335 are attached to drive chains 333 by means of hinge attachments 336. These hinge attachments 336 allow cook plates 335 to hang vertically from the lower segments of drive chains 333, and to rest horizontally on the hinge attachments 336 on the upper segments of drive chains 333.

A lower heating plate 360 is attached horizontally to the frame 310 in vertical alignment with upper cook plate assembly 330. Lower heating plate 360 is heated by a lower heating means 362. Lower cook plates 335 are arranged on drive chains 333 in groups 337 which can be maneuvered into alignment with upper cook plate assembly 320 and lower heating plate 360. The groups 337 are separated by indexing pegs 338 attached to drive chains 333. These indexing pegs 338 serve to support the last cook plate in each group 337 on the upper segments of drive chains 333.

The operation of automated grill 300 is similar to that of grills 100 and 200. A human operator loads hamburger patties, eggs, or other food items to be cooked (not shown) onto a group 337 of cook plates 335. Motor 334 rotates sprockets 332 and drive chains 333 so as to cause the group of cook plates to come into alignment with upper cook plate assembly 320 and lower heating plate 360, at which point motor 334 ceases to rotate for a preset period of time. Lower heating plate 360 heats the group of cook plates 335 to a desired cooking temperature. Press air cylinders 322 lower the upper cook plate 326 into contact with the food items.

As the food items cook, the human operator loads food items onto the next group of cook plates 335. After a predetermined period of time, press air cylinders 322 raise the upper cook plate assembly 320, and motor 334 rotates to bring the next group of cook plates into alignment with upper cook plate 326 and lower heating plate 360. Press air cylinders 322 then lower the upper cook plate 326 into contact with the second group of food items.

This process continues until the human operator turns the system off. As each cook plate 335 reaches the left end of grill 300, the rotation of the drive chains 333 around the sprockets 332 causes the cook plate to rotate through 270° until it hangs vertically from the drive chains 333. During this rotation of the cook plate 335, the food items which it carries are dumped into collection pan 340.

A switch 339 attached to the frame 310 registers the passage of each hinge attachment 336 and indexing peg 338. This switch 339 provides input to a control circuit (not shown), which coordinates the movements of the motor 334 and the upper cook plate assembly 320.

While the invention has been particularly shown and described by the foregoing detailed description, it will be understood by those skilled in the art that various other changes in form and detail may be made without departing from the spirit and scope of the invention. For example, while hamburger patties have been used to illustrate the operation of the preferred embodiments of the invention, it will be understood that steaks, eggs, and any other food items could be cooked using the invention.

What is claimed is:

1. A system for automatically grilling food products comprising:

an upper cook plate affixed to a platform;

a first actuator for moving the platform from a first position to a second position;

a food carrier plate affixed to a reciprocating shuttle, the food carrier plate being adjacent to the upper cook plate when the platform is in the first position;

a second actuator for positioning the shuttle; and a control mechanism for automatically and synchronously controlling the movement of the platform and the positioning of the shuttle;

wherein the upper cook plate has a first surface area; and wherein the food carrier plate has a second surface area which is larger than the first surface area.

2. The grilling system of claim 1, wherein the food carrier plate comprises a plurality of sections, the system further comprising a third actuator for rotating a first one of the sections of the food carrier plate about a first axis, said third actuator being controlled by the control mechanism.

3. The grilling system of claim 2, further comprising a fourth actuator for rotating a second one of the sections of the food carrier plate about a second axis, said fourth actuator being controlled by the control mechanism.

4. The grilling system of claim 1, further comprising:

a first food product removal arm for removing grilled food products from a first section of the food carrier plate; and a first food removal actuator for positioning the first food product removal arm, said first food removal actuator being controlled by the control mechanism.

5. The grilling system of claim 4, further comprising:

a second food product removal arm, for removing grilled food products from a second section of the food carrier plate; and a second food removal actuator for positioning the second food product removal arm, said second food removal actuator being controlled by the control mechanism.

6. A system for automatically grilling food products, comprising:

a food carrier plate affixed to a reciprocating shuttle means for moving the food carrier plate, the food carrier plate having a first and a second section;

an upper cook plate affixed to a pressing means for moving the upper cook plate;

a control means for automatically coordinating the movement of the food carrier plate and the movement of the upper cook plate; and a first rotation means for rotating the first section of the food carrier plate about a first rotation axis.

7. The grilling system of claim 6, further comprising a second rotation means for rotating the second section of the food carrier plate about a second rotation axis.

8. The grilling system of claim 7, wherein the first and second rotation axes are substantially parallel to the food carrier plate.

9. A system for automatically grilling food products, comprising:

a food carrier plate affixed to a reciprocating shuttle means for moving the food carrier plate;

an upper cook plate affixed to a pressing means for moving the upper cook plate;

a control means for automatically coordinating the movement of the food carrier plate and the movement of the upper cook plate; and a first pushing means for removing food products from a first section of the food carrier plate.

10. The grilling system of claim 9, further comprising a second pushing means for removing food products from a second section of the food carrier plate.

* * * * *